(12) United States Patent  
Szajnowski

(10) Patent No.: US 8,154,436 B2  
(45) Date of Patent: Apr. 10, 2012

(54) OBJECT DETECTION

(75) Inventor: Wieslaw Jerzy Szajnowski, Guildford (GB)

(73) Assignee: Mitsubishi Electric Information Technology Centre Europe B.V., Surrey (GB)

( * ) Notice: Subject to any disclaimer, the term of this patent is extended or adjusted under 35 U.S.C. 154(b) by 592 days.

(21) Appl. No.: 12/083,936

(22) PCT Filed: Oct. 23, 2006

(86) PCT No.: PCT/GB2006/003931  
§ 371 (c)(1),  
(2), (4) Date: Apr. 3, 2009

(87) PCT Pub. No.: WO2007/049014  
PCT Pub. Date: May 3, 2007

(65) Prior Publication Data  
US 2009/0212998 A1 Aug. 27, 2009

(30) Foreign Application Priority Data  
Oct. 24, 2005 (EP) .................................... 05256590

(51) Int. Cl.  
*G01S 13/00* (2006.01)  
*G01S 13/08* (2006.01)  
(52) U.S. Cl. ........... 342/70; 342/118; 342/134; 342/159  
(58) Field of Classification Search ................... 342/27, 342/70–72, 118, 134, 159, 202–204; 375/130–153, 375/295–315  
See application file for complete search history.

(56) References Cited

U.S. PATENT DOCUMENTS

| 5,291,202 | A   | * | 3/1994  | McClintock ..................... 342/16  |
| 5,847,677 | A   | * | 12/1998 | McCorkle ....................... 342/204 |
| 6,225,943 | B1  | * | 5/2001  | Curley et al. .................. 342/137 |
| 6,385,268 | B1  | * | 5/2002  | Fleming et al. ................ 375/377  |
| 6,400,754 | B2  | * | 6/2002  | Fleming et al. ................ 375/140  |
| 6,414,627 | B1  | * | 7/2002  | McEwan ......................... 342/134  |
| 6,539,320 | B1  | * | 3/2003  | Szajnowski et al. ............. 702/79   |
| 6,693,582 | B2  | * | 2/2004  | Steinlechner et al. ........... 342/70   |
| 6,717,992 | B2  | * | 4/2004  | Cowie et al. ................... 375/316  |
| 7,280,587 | B2  | * | 10/2007 | Motoyoshi et al. ............. 375/150   |
| 7,408,499 | B2  | * | 8/2008  | Szajnowski ..................... 342/70   |
| 2005/0261834 | A1 | * | 11/2005 | Szajnowski et al. ........... 701/301  |
| 2006/0244653 | A1 | * | 11/2006 | Szajnowski ..................... 342/70  |

(Continued)

FOREIGN PATENT DOCUMENTS

EP  1 330 031 A1  7/2003

(Continued)

*Primary Examiner* — Thomas Tarcza  
*Assistant Examiner* — Peter Bythrow  
(74) *Attorney, Agent, or Firm* — Birch, Stewart, Kolasch & Birch, LLP.

(57) ABSTRACT

An object is detected by generating a m-ary primary signal having an irregular sequence of states. Each transition results in the transmission of a pulse encoded according to the type of transition. Reflected pulses are processed with a delayed, reference version of the primary signal. The presence of an object at a range corresponding to the delay is determined from the extent to which the reflected pulses coincide with transitions in the reference signal. In one aspect, transitions between states of the primary signal occur at varying time offsets with respect to nominal regular clock pulses. In another aspect, the object-detection system is operated while inhibiting the transmission of pulses, and if a significant output is obtained, the parameters of the transmitted signal are altered.

17 Claims, 12 Drawing Sheets

U.S. PATENT DOCUMENTS

2009/0212998 A1* 8/2009 Szajnowski .................. 342/204
2009/0295619 A1* 12/2009 Szajnowski .................. 342/27

FOREIGN PATENT DOCUMENTS

| GB | 1 380 451 A | 7/1972 |
| GB | 1 380 451 A | 1/1975 |
| JP | 11-166968 A | 6/1999 |
| JP | 2002-533732 A | 10/2002 |
| JP | 2003-255045 A | 9/2003 |
| JP | 2003-279644 A | 10/2003 |
| JP | 2004-254076 A | 9/2004 |
| WO | WO 2005/006014 | 1/2005 |

* cited by examiner

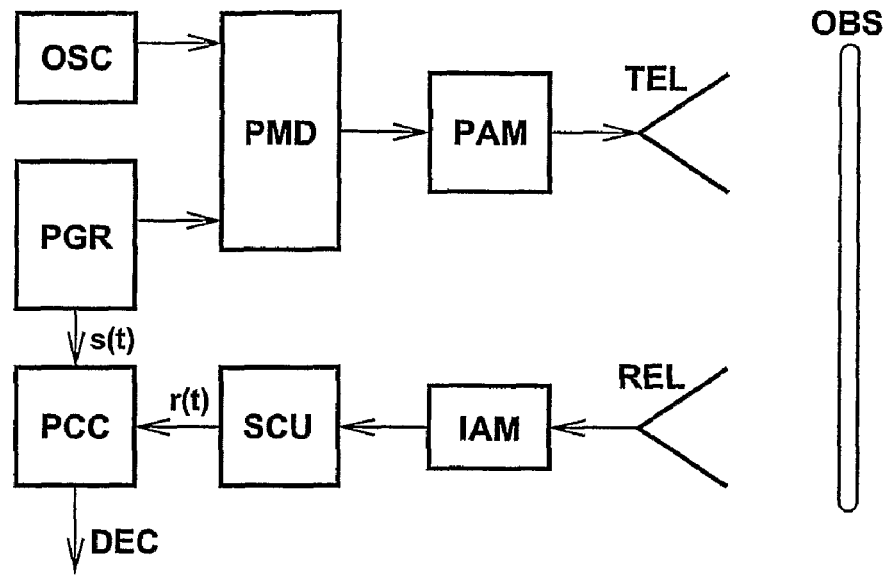
*Fig. 1*     *PRIOR ART*
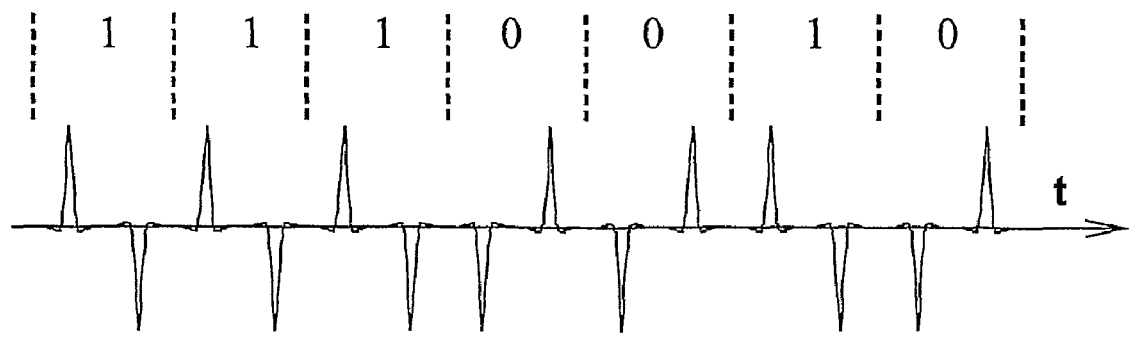
*Fig. 2*     *PRIOR ART*

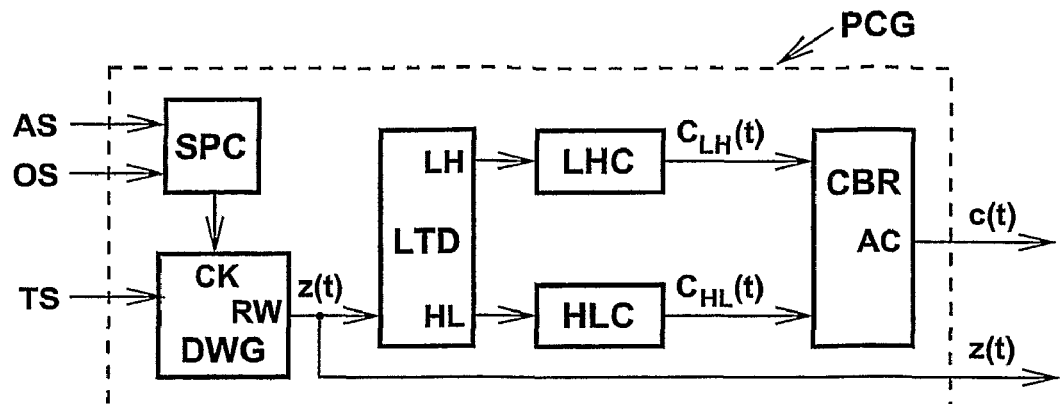
Fig. 3
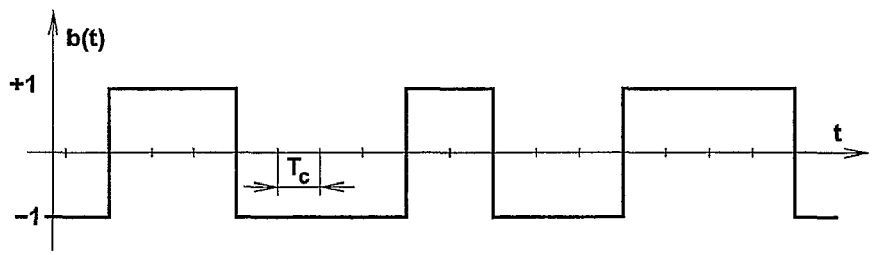
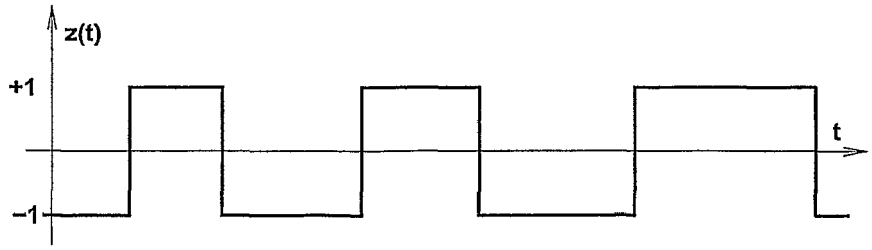
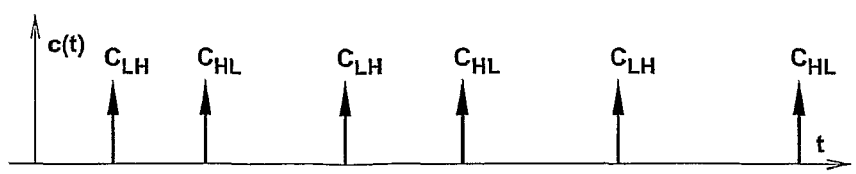
Fig. 4

|    | 'template select' TS input | | | | binary patterns | | | | | |
|----|----|----|----|----|----|----|----|----|----|----|
|    | V3 | V2 | V1 | V0 | X1 | X2 | X3 | X4 | X5 | X6 |
| 0  | 0 | 0 | 0 | 0 | 1 |   |   |   |   |   |
| 1  | 0 | 0 | 0 | 1 |   |   |   |   |   | 1 |
| 2  | 0 | 0 | 1 | 0 | 1 | 1 | 1 |   |   |   |
| 3  | · | · | · | · |   |   |   | 1 | 1 | 1 |
| 4  | · | · | · | · |   | 1 | 1 | 1 |   |   |
| 5  | · | · | · | · |   | 1 | 1 | 1 |   |   |
| 6  | · | · | · | · |   | 1 |   | 1 |   | 1 |
| 7  | · | · | · | · | 1 |   | 1 |   | 1 |   |
| 8  | · | · | · | · | 1 |   | 1 |   |   | 1 |
| 9  | · | · | · | · | 1 |   |   | 1 |   | 1 |
| 10 | · | · | · | · |   | 1 |   |   | 1 | 1 |
| 11 | · | · | · | · | 1 | 1 |   |   | 1 |   |
| 12 | · | · | · | · | 1 | 1 |   | 1 | 1 | 1 |
| 13 | · | · | · | · | 1 | 1 | 1 |   | 1 | 1 |
| 14 | 1 | 1 | 1 | 0 | 1 | 1 | 1 | 1 | 1 |   |
| 15 | 1 | 1 | 1 | 1 |   | 1 | 1 | 1 | 1 | 1 |

OBJECT DETECTION

BACKGROUND OF THE INVENTION

1. Field of the Invention

This invention relates to a method and apparatus for the generation and processing of trains of pulses, for example to be utilized as interrogating waveforms in object detection systems such as multi-user active sensor systems and particularly, but not exclusively, in automotive radar systems designed to perform functions of obstacle-detection and/or collision-avoidance.

2. Description of the Prior Art

One important type of obstacle-detection/collision-avoidance automotive systems employs short pulses of electromagnetic energy to interrogate the detection zone of interest. A decision regarding the presence or absence of an obstacle at a predetermined range is then made by suitably processing energy backscattered by various objects in the field of view of the system.

FIG. 1 is a block diagram of a conventional obstacle-detection system utilizing short pulses of electromagnetic energy. The system comprises a pulse generator PGR that produces repetitively pulses with duration $T_P$ and repetition period $T_{REP}$. The pulse duration $T_P$ is so selected as to provide a required range resolution c $T_P/2$, where c is the speed of light; the unambiguous range of the system is equal to c $T_{REP}/2$.

The system of FIG. 1 also includes an oscillator OSC that generates a sinusoidal signal with required carrier frequency, a pulse modulator PMD that modulates the carrier signal in an on-off fashion, a power amplifier PAM that amplifies the pulsed carrier signal to a required level, a transmit element TEL that radiates pulses of electromagnetic energy towards an obstacle OBS, a suitable receive sensor REL that receives electromagnetic pulses reflected back by the obstacle OBS, an input amplifier IAM that amplifies the signal provided by the receive sensor REL, a signal conditioning unit SCU that employs suitable signal processing to shape the received pulses, and a pulse-coincidence correlator PCC that processes jointly delayed reference pulses s(t) supplied by the generator PGR and reconstructed pulses r(t) supplied by the signal conditioning unit SCU to obtain an output value dependent on the extent to which received pulses r(t) coincide with reference pulses s(t) and thus provide a decision DEC regarding the presence or absence of an obstacle at a predetermined range corresponding to the delay applied to the reference pulses s(t). The operation can be repeated for other delay values.

It is known that object detectability can be improved significantly when the average power of an interrogating waveform is increased. In the case of electromagnetic pulses with predetermined duration and limited peak power, this can only be achieved if a basic periodic pulse train is replaced by an interrogation signal in the form of a specially constructed composite pulse train comprising unequally spaced (staggered) pulses. While the basic pulse train employs only one pulse per period, the number of pulses occurring within a single period of the composite pulse train can be much greater than one. However, in order to preserve the same unambiguous range of the system, the autocorrelation function of the composite pulse train will have to exhibit low values between its periodically occurring peaks.

As well known to those skilled in the art, various techniques have been developed for constructing pulse sequences with good autocorrelation properties (see for example, P. Fan and M. Darnell, *Sequence Design for Communications Applications*. Wiley, 1996).

In a multi-user environment, active sensor systems may transmit their own interrogating pulse trains simultaneously and asynchronously so that not only must each system recognize and detect responses to its own transmitted pulses, but it must be able to do so in the presence of all other transmitted pulse trains. For example, in automotive applications, many similar obstacle-detection systems should be capable of operating in the same region, and also be capable of sharing the same frequency band. To avoid mutual interference, each sensor system should use a distinct pulse train, preferably uncorrelated with the pulse trains employed by all other systems. However, because it is not possible to predict which of the many similar systems will be operating in a particular region, it is not practical to assign a distinct pulse train to each of them.

The problem of constructing a large set of composite pulse trains from few underlying 'template' pulse trains can be solved, at least partly, by exploiting in a judicious way some random or pseudorandom mechanism in the process of pulse train generation. For example, EP-A1-1330031 and WO-A1-2005/006014 disclose methods which exploit various random mechanisms to generate large sets of composite pulse trains well suited to multi-user applications. The contents of these patent applications are incorporated herein by reference. (Hereinafter, the term "random" is intended to include, where context permits and without limitation, not only purely random, non-deterministically generated signals, but also pseudo-random and/or deterministic signals such as the output of a shift register arrangement provided with a feedback circuit as used in the prior art to generate pseudo-random binary signals, and chaotic signals.)

According to the method disclosed in the above-mentioned patent applications, a composite pulse train consists of a sequence of primary pulse packets each of which is drawn at random from a predetermined set of suitably constructed primary pulse packets with prescribed properties. Consequently, although each user may have at its disposal the same set of primary pulse packets, a composite pulse train transmitted by each user is unique, being assembled in a random manner.

Short electromagnetic pulses transmitted by some obstacle-detection/collision-avoidance automotive systems may have the same duration and amplitude, yet the pulses can still be discriminated on the basis of their carrier frequency, phase, polarisation, or in the case of carrier-less ultrawideband (UWB) systems, their polarity.

One class of obstacle-detection collision-avoidance systems employs pulse trains obtained by suitable encoding of pseudorandom binary sequences, well known to those skilled in the art (see for example, R. C. Dixon, *Spread Spectrum Systems with Commercial Applications*. Wiley, 1994). One such prior-art construction, intended for UWB systems, is depicted in FIG. 2; as seen, each binary symbol of an underlying pseudorandom binary sequence is represented by a pulse 'doublet' or its reversed-polarity replica. Another technique, disclosed in U.S. Pat. No. 6,693,582, makes use of both amplitude shift keying and phase shift keying to provide an improved utilization of pseudorandom binary sequences in automotive radar systems. The contents of U.S. Pat. No. 6,693,582 are incorporated herein by reference.

It would be desirable to provide an improved method for the generation and processing of trains of pulses, particularly pulses suitable to be utilized by active sensor systems designed to perform functions of obstacle-detection and/or collision-avoidance in a multi-user environment.

SUMMARY OF THE INVENTION

Aspects of the present invention are set out in the accompanying claims.

In accordance with a first additional and independent aspect of the invention, a digital generator of a periodic template binary waveform is driven by clock pulses with the interpulse interval varying in a pseudorandom cyclical manner to produce an output binary waveform with level transitions occurring at jittered ('randomised') time instants at each of which pulse, for example a short transient signal referred to as a click, is generated, a characteristic of the pulse being dependent on the type of transition. The duration of a segment of such generated series of clicks to be used for ranging is a predetermined function of both the period of the template waveform and the cycle of a pseudorandom signal employed for clock spreading.

Using such a technique, it is possible to provide an improved method for encoding pseudorandom binary sequences to obtain a plurality of pulse trains intended for ranging applications.

A template binary waveform b(t) may be produced by a digital binary waveform generator in response to clock pulses with a constant period $T_c$; a particular template waveform can be selected from a plurality {b(t)} of such waveforms forming a library of template binary waveforms.

Preferably, the autocorrelation function of each periodic template binary waveform b(t) will exhibit relatively low values outside the main correlation peak, making the waveform b(t) suitable for ranging applications. Preferably, the period of clock pulses is uniformly distributed, for example as a result of employing a suitable pseudorandom signal.

Because clock pulses driving the digital binary waveform generator have had their period spread in a pseudorandom manner, a binary waveform z(t) obtained at the output of the generator is switched between its two levels, low and high, at 'randomised' time instants.

Preferably, at each such switching time instant, one of two clicks will be generated:

click $C_{LH}(t)$, to represent the 'low-high' (LH) level transition;

click $C_{HL}(t)$, to represent the 'high-low' (HL) level transition.

For optimum discrimination between the 'low-high' (LH) and 'high-low' (HL) level transitions, the two clicks, $C_{LH}(t)$ and $C_{HL}(t)$, that represent the transitions will preferably have the same duration and energy, yet they will be distinct. This can be achieved by suitable exploitation of an additional measurable parameter of the clicks, such as carrier frequency, or in the case of UWB systems, polarity.

Other parameters of coherent electromagnetic radiation, such as phase or polarisation, could additionally or alternatively be used, but may be of only limited practical applicability in relatively simple obstacle detection systems. Furthermore, when there is a relative movement between an obstacle and the sensor, the use of phase as a discriminant parameter may lead to a significant degradation of detection performance due to Doppler effect.

In accordance with a second additional and independent aspect of the invention, there is provided a method for sensing the surrounding electromagnetic environment and selecting adaptively a structure of interrogating pulse train that will ensure an improved obstacle detection in the presence of interfering pulses transmitted by other users operating in the region.

This aspect of the invention can be achieved by operating a detection circuit while inhibiting the transmission of the detection system's own interrogating pulses. If a significant output response is obtained, as a result of receiving pulses from other systems, the structure of the interrogating pulse train can be altered. This can be repeated until a low output is received, following which the system's own interrogating pulses can be transmitted.

The first and second additional aspects of the invention set out above can be used independently of each other, although a particularly preferred embodiment of the invention uses both aspects in combination.

Although the invention will be described predominantly in the context of binary systems, in which each pulse is encoded to represent a respective one of the two possible types of state transitions, the invention is generally applicable to m-ary systems, in which case the pulses are preferably encoded to represent the m(m−1) possible types of state transitions.

BRIEF DESCRIPTION OF THE DRAWINGS

Arrangements embodying the present invention will now be described by way of example with reference to the accompanying drawings.

FIG. 1 is a block diagram of a conventional obstacle-detection system utilizing short pulses of electromagnetic energy.

FIG. 2 illustrates schematically a prior-art method of representing binary symbols of a pseudorandom binary sequence by pulse 'doublets'.

FIG. 3 is a block diagram of a programmable click generator capable of generating a series of antithetic clicks in accordance with the invention.

FIG. 4a depicts an example of a template binary waveform b(t).

FIG. 4b depicts a binary waveform z(t), with 'randomised' level transitions, that has originated from the template binary waveform b(t) of FIG. 4a.

FIG. 4c depicts symbolically a series c(t) of alternating antithetic clicks generated by the level transitions of the waveform z(t) of FIG. 4b.

FIG. 8a depicts the main part of the autocorrelation function $R_{bb}(\tau)$ of a pseudorandom binary signal used as a template binary waveform b(t).

FIG. 8b depicts the shape of the normalised autocorrelation function $R_{pp}(\tau)$ of the time derivative p(t) of the template binary waveform b(t) shown in FIG. 8a.

FIG. 8c depicts the normalised autocorrelation function $R_{qq}(\tau)$ of a series q(t) of impulses with 'randomised' positions.

FIG. 8d depicts the normalised autocorrelation function $R_{cc}(\tau)$ of a series c(t) of bipolar pulse clicks obtained from a pseudo-random binary signal (prbs) generator driven by spread-period clock pulses.

FIG. 10 lists 16 four-variable logic functions that determine the form of a particular template binary waveform b(t).

FIG. 17 is an example of an 8×8 input-output connection matrix based on a pattern of '8 non-attacking Queens'.

FIG. 18 shows an example of a 10×8 input-output connection matrix with 'deselected' columns 1 and 10.

DETAILED DESCRIPTION OF THE PREFERRED EMBODIMENTS

Figure 15:
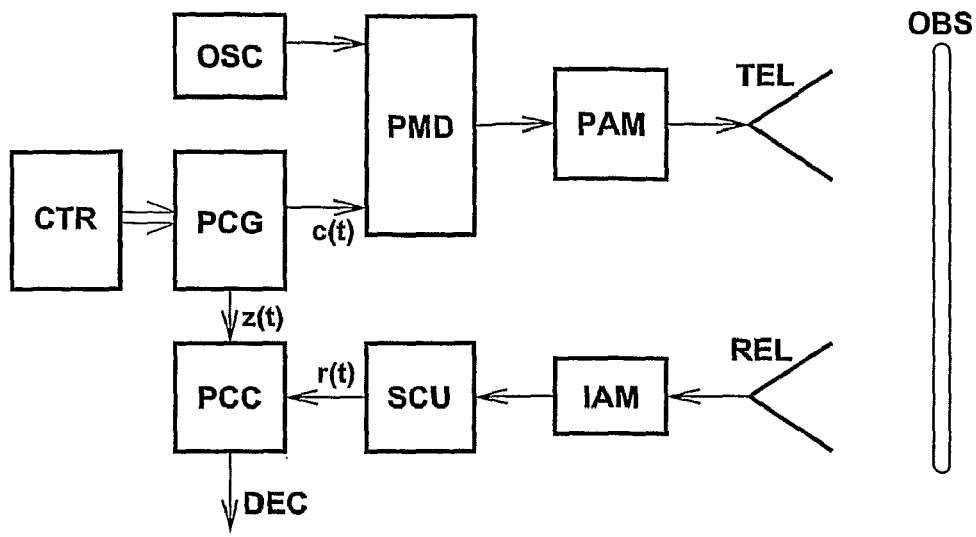
FIG. 15 is a block diagram of another multi-user obstacle-detection system according to the present invention.

FIG. 15 is a block diagram of a multi-user obstacle-detection system according to the present invention. The system is similar to that of FIG. 1, and like parts are designated by like references, except as described below.

The system of FIG. 15 has, in place of the pulse generator PCG of FIG. 1, a programmable click generator PCG and a controller CTR.

FIG. 3 is a block diagram of the programmable click generator PCG, which is capable of generating a series of pulses, each pulse being encoded to represent a state transition of a binary waveform having an irregular sequence of states. Preferably, the pulses are in the form of clicks. In the following, two distinct clicks that represent the two types of transitions will be referred to as antithetic clicks.

The programmable click generator PCG of FIG. 3 comprises a digital binary waveform generator DWG, a spread-period clock generator SPC, a level-transition detector LTD, two click generating circuits, LHC and HLC, and a click combiner CBR.

A specific template binary waveform b(t) can be selected by the controller CTR (see FIG. 15) from a library of predetermined templates by applying a suitable signal to a 'template select' input TS of the generator DWG. Each template binary waveform is based on a sequence which has a narrow autocorrelation function, and is preferably generated using a pseudo-random sequence generator. The generator DWG is driven via input CK by clock pulses supplied by the spread-period clock generator SPC.

In response to clock pulses appearing at input CK, the generator DWG produces at output RW a binary waveform z(t) with level transitions at 'randomised' timings. Alternately, the waveform z(t) can be viewed as a result of 'randomised' time scaling of the template binary waveform b(t). The randomisation of the time periods is preferably achieved using a pseudo-random number generator, in order to obtain a desired (preferably uniform) distribution of interpulse intervals between predetermined upper and lower limits.

The binary waveform z(t) obtained from the generator DWG is applied to the level-transition detector LTD, whose two outputs, LH and HL, drive the two click generating circuits, LHC and HLC, respectively. The alternating output clicks, $C_{LH}(t)$ and $C_{HL}(t)$, are combined in the click combiner CBR to produce at output AC a resulting series c(t) of antithetic clicks.

Thus, in the arrangement of FIG. 3, a template binary waveform b(t) is arranged to produce a series c(t)

..., $C_{LH}(t_{m-1})$, $C_{HL}(t_m)$, $C_{LH}(t_{m+1})$, $C_{HL}(t_{m+2})$, ...

comprising alternating antithetic clicks occurring at 'randomised' times $\{t_m\}$, governed by the statistical characteristics of clock pulses with jittered interpulse interval.

It should be noted that a single template binary waveform b(t) can give rise to a plurality $\{c(t)\}$ of different antithetic click series, each such series originating from differently spread clock pulses. As will be clear, various parameters can be altered to change the characteristics of the interrogating signal formed by the series of clicks, including the selected template sequence, the sequence of the varying interpulse intervals and the average of the interpulse intervals.

FIG. 4a, FIG. 4b and FIG. 4c depict, respectively, examples of: a template binary waveform b(t), a corresponding binary waveform z(t) with 'randomised' level transitions, and a resulting series c(t) of alternating antithetic clicks that are represented symbolically by impulses.

Figure 5:
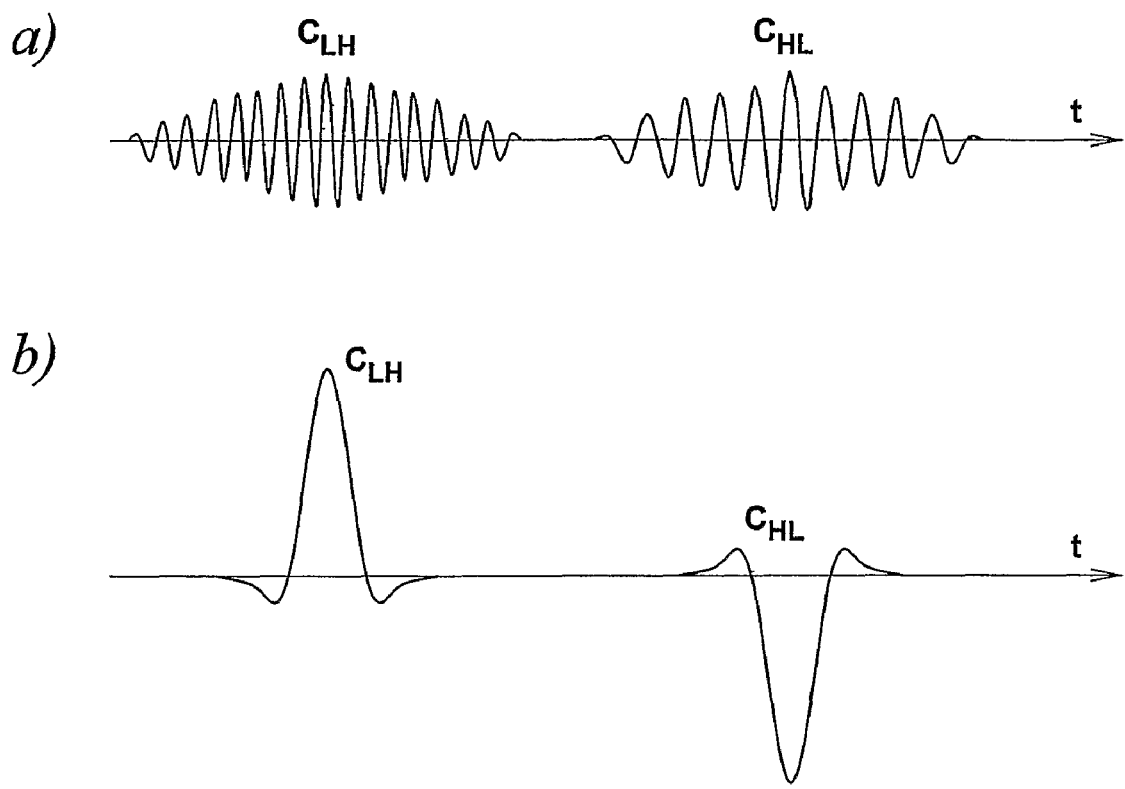
FIG. 5a shows an example of representing antithetic clicks by two short pulses with different values of carrier frequency.
FIG. 5b shows an example of representing antithetic clicks by two 'Mexican hat'-shaped impulses of opposite polarity, well suited to UWB systems.

FIG. 5a and FIG. 5b show, respectively, examples of representing the encoded antithetic clicks as: two short pulses with different values of carrier frequency, and two 'Mexican hat'-shaped impulses of opposite polarity, well-suited to UWB systems.

The spread-period clock generator SPC operates cyclically and preferably performs the following functions within each full cycle:

1. generation of a prescribed number J of clock pulses in such a way that each value of the interpulse interval occurs exactly once, the values of the shortest and the longest intervals, $T_{min}$ and $T_{max}$, being predetermined, ordering of the interval values being seemingly random, and the distribution of the interval values being uniform between their extreme values, $T_{min}$ and $T_{max}$;

2. modification, in response to an external signal AS, of the average value of the interpulse interval;

3. modification, in response to an external signal OS, of the order in which respective values of the interpulse intervals occur (permutation).

Example 1 that follows will facilitate the understanding of the characteristics of sequences of clock pulses produced by the spread-period clock generator SPC.

Example 1

Figure 6:
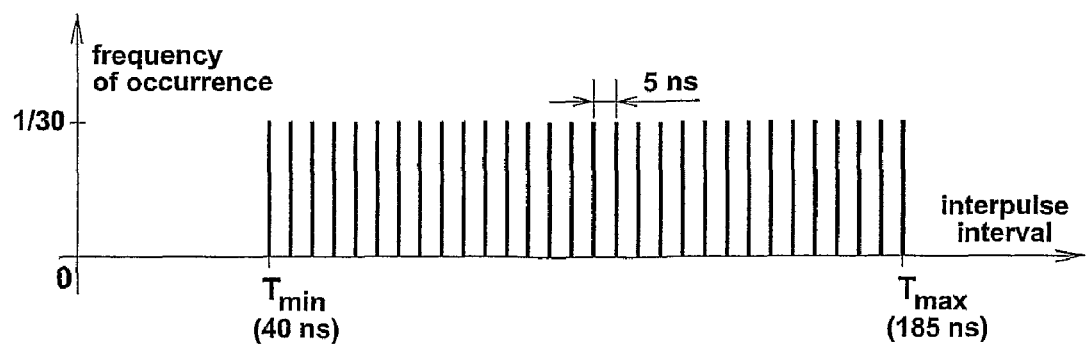
FIG. 6 depicts an example of a histogram of clock interpulse intervals with uniform spread.

Assume that the number J of clock pulses occurring in a single cycle is equal to 30, and that the minimum and maximum values of the interpulse interval are, respectively, $T_{min}$=40 ns and $T_{max}$=185 ns. Because each value of the interpulse interval is to occur exactly once, the histogram of the interval values will be of the form shown in FIG. 6. As seen, the durations of the interpulse intervals increase in steps of 5 ns.

In this case, the average value of the interpulse interval is equal to 112.5 ns, but may easily be varied, e.g. by changing the minimum value $T_{min}$ of the interpulse interval. This can be accomplished by applying a suitable signal to input AS of the spread-period clock generator.

While the order in which different interpulse interval values occur cannot change the histogram shape, it does make the resulting series of antithetic clicks statistically distinct, especially when the permutation of interval values is carried out repeatedly, e.g., on a cycle-to-cycle basis. The interval permutation can be accomplished by applying a suitable signal to input OS of the spread-period clock generator.

Figure 16:
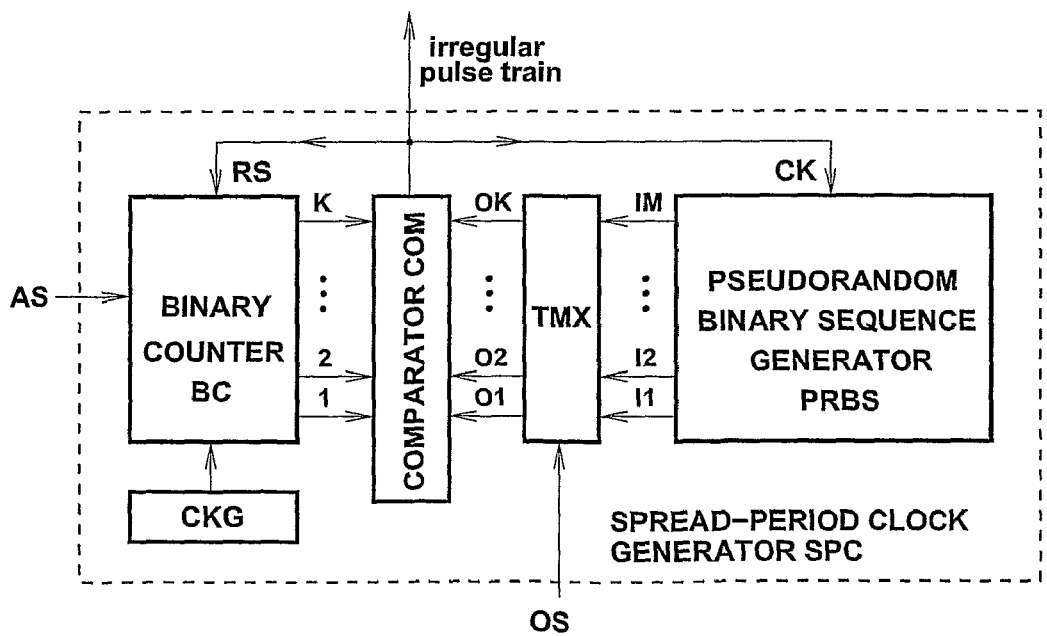
FIG. 16 is a block diagram of a variable clock generator suited for use in apparatus in accordance with the present invention.

FIG. 16 is a block diagram of a spread-period clock generator SPC (also referred to herein as a variable clock generator) which can be used in the arrangement of FIG. 3. The generator produces clock pulses with, by design, uniform distribution of inter-pulse interval in such a way that during each measurement cycle each interval value occurs exactly the same number of times as any other value. However, during each measurement cycle, all the values may appear in different order due to a permutation mechanism incorporated into the design. The generator comprises a K-bit binary counter BC, a suitable constant-period clock generator CKG, a comparator COM, a pseudorandom binary sequence PRBS) generator and a transition-matrix circuit TMX.

The pseudorandom binary sequence (PRBS) generator is a conventional M-cell shift register with linear feedback, well known to those skilled in the art. In its basic configuration, the PRBS generator supplies at its parallel outputs binary numbers from the range $(1, 2^M-1)$. In some cases, it may be advantageous to include the all-zero binary word, thus extending the range of produced numbers to $(0, 2^M-1)$. Modifications of a linear feedback needed to include the all-zero word are known to those skilled in the art.

Irrespective of the range span, each number from the allowable range appears exactly once during one full period of the PRBS generator, and the order of number appearance depends on the form of the linear feedback. A new number appears in response to a pulse applied to input CK.

The variable clock generator SPC operates as follows:

At the start of each interval, the random number generator supplies a M-bit non-negative random value RN to the transition matrix TMX, which transposes the bits forming the number so as to obtain a different but related number TN to the comparator COM. The K-bit binary counter BC is 'counting up' clock pulses obtained from the clock generator CKG. The initial state of the counter is set to some negative value –NV which is dependent on the external signal AS from the controller CTR (see FIG. 15), and which corresponds to the shortest inter-pulse interval $T_{min}=(NV)T_c$ of the irregular output pulses, where $T_c$ is the period of clock pulses supplied by the CKG. The longest inter-pulse interval $T_{max}$ can be determined from $T_{max}=T_{min}+(2^K-1)T_c$. Accordingly, the inter-pulse interval of the irregular output pulses is $(T_{ave}+VO)$, wherein $T_{ave}=(T_{min}+T_{max})/2$ represents a notional regular output clock pulse period and VO is a varying time offset which can have both positive and negative values.

The binary counter BC will count clock pulses until the accumulated count is found, by the comparator, to match the output TN of the transition-matrix circuit TMX (and consequently until the count bears a predetermined relationship with the number generated by the pseudorandom binary sequence generator, this relationship being defined by the pattern of the transition-matrix circuit TMX). When the state of the counter reaches the non-negative K-bit value TN, the comparator COM produces a suitable pulse used to form an output clock pulse and also to:

set the counter via input RS to its initial state –NV;
trigger the random number generator via input CK which results in a new M-bit random value RN, and thus a new transposed number TN, being produced.

If M-bit numbers produced by the random number generator are distributed uniformly, then the distribution of the time interval between consecutive pulses produced by the comparator will also be uniform. Accordingly, those pulses will form an irregular pulse train utilized by the system shown in FIG. 3.

Example

Assume that K=6, –NV=–4 and $T_c$=5 ns.
Therefore, $T_{min}=(NV)T_c=20$ ns, whereas $T_{max}=T_{min}+(2^K-1)T_c=215$ ns.

In a general case, the transition-matrix circuit TMX has M inputs and K outputs, where M≧K. However, in the simplest arrangement, M=K, and the TMX has K inputs, I1, I2, . . . , IK and K outputs, O1, O2, . . . , OK; hence the PRBS generator has K parallel outputs driving inputs I1, I2, . . . , IK. The operation of the TMX can be explained by way of an example shown in FIG. 17. The pattern of K, K=8, dots in a K×K matrix corresponds to input-output connections realized by the TMX. Therefore, in this case, O1=I7, O2=I1, . . . , O7=I2 and O8=I5. Obviously, each column and each row of the matrix must contain exactly one dot.

Figures 17, 18:
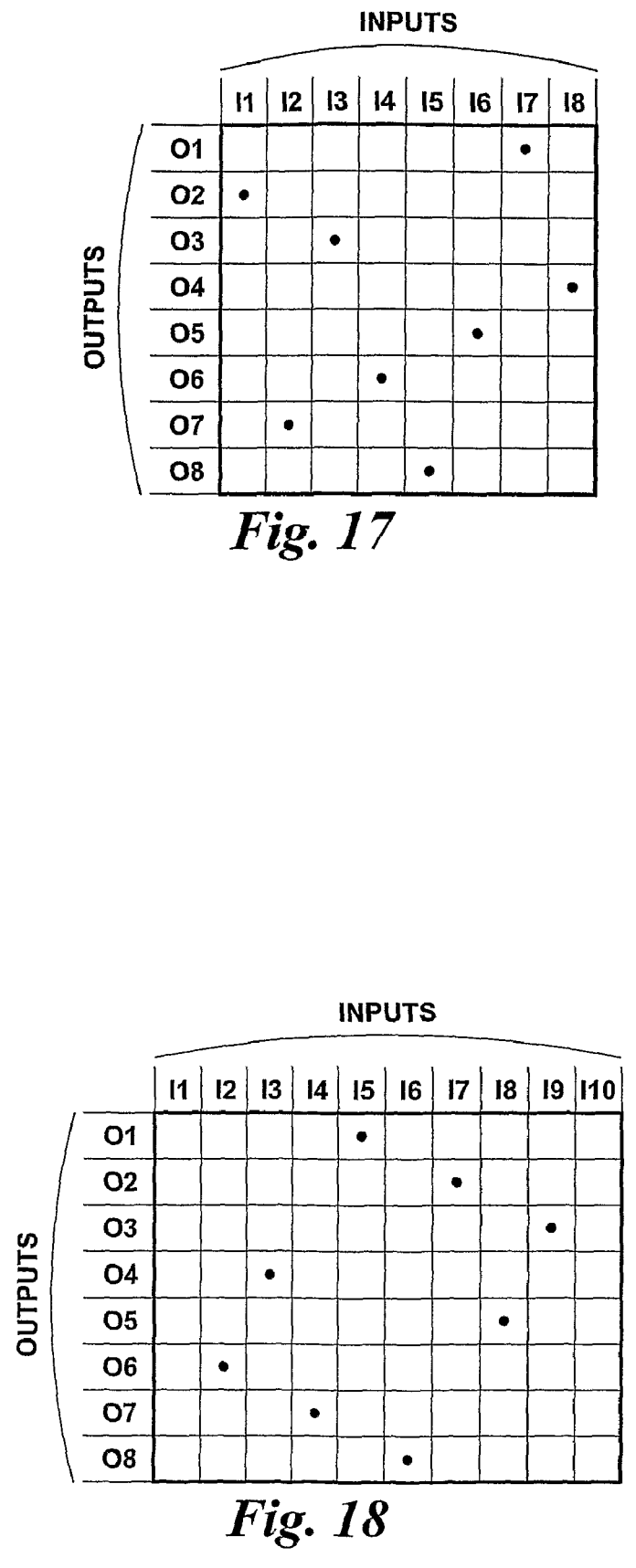

Although many different dot patterns can be devised for this application, it may be advantageous to utilize a dot pattern belonging to a class of patterns referred to as 'K non-attacking Queens', such as the dot pattern shown in FIG. 17. Also, other well-known designs, such as Costas arrays, may prove very useful in some specific applications.

In the preferred embodiment, a different dot pattern may be used to change the sequence in which the varying time offsets occur. A particular dot pattern may be selected from a predetermined set of patterns in a deterministic or non-deterministic fashion in response to an external signal OS from the controller CTR, thus altering the predetermined relationship detected by the comparator between the count value and the random number RN. The pattern selection task is carried out by the control unit CTR.

FIG. 18 shows an example of input-output connections when M>K, with M=10 and K=8. In this case, it is assumed that the PRBS generator supplies all values from 0 to 1023, and hence one complete period comprises 1024 values. During that period, outputs O1, O2, . . . , O8 will supply all numbers from 0 to 256 exactly four times, yet with a form of irregularity different from that provided by a single 8×8 matrix.

Also in this case, a different dot pattern may be used in response to the signal OS. A particular dot pattern can be selected from a predetermined set of patterns in a deterministic or non-deterministic fashion. The pattern selection task is carried out by the controller CTR. Additionally, the controller CTR can 'deselect' (M–K) inputs from the M inputs in a deterministic or non-deterministic fashion to change the irregular sequence of produced numbers (hence, time intervals).

In addition to, or instead of, permutations obtained from changing the input-output connection matrix in the TMX, the form of feedback used by the PRBS generator may also be varied. A particular feedback function can be selected from a predetermined set of functions in a deterministic or non-deterministic fashion. The feedback selection task could also carried out by the controller CTR.

Some or all of the above permutation mechanisms can be combined in order to increase the irregularity of a sequence of numbers (thus time intervals) produced by the joint operation of the controller CTR, the PRBS generator and the transition-matrix circuit TMX, and/or to increase the number of different sequences which can be produced.

In the above arrangement, the PBRS generator is arranged so that each generated random number appears as often as all other generated numbers, thus ensuring a uniform distribution of clock periods within a specified range. In an alternative arrangement, the uniform distribution of clock periods is achieved without requiring such a structure of the PBRS generator, by repeatedly changing the pattern of the transition-matrix circuit TMX so that each input is linked to each output for substantially equal number of number-generating operations.

In a multi-user scenario, while each sensor system employs an identical digital binary waveform generator, each particular generator is driven by clock pulses 'randomised' in a way different from that used by all other systems. Consequently, the series of antithetic clicks generated by different sensor systems will be distinct, having resulted from substantially different trains of clock pulses. In this context, the binary waveform generator can be viewed as a suitable (deterministic) mapping device that converts different realizations of random, and preferably pseudorandom, clock pulses into corresponding series of alternating antithetic clicks.

The suitability of such generated series $c(t)$ of antithetic clicks to multi-user ranging applications will depend mainly on the autocorrelation and cross-correlation properties of the underlying family of template binary waveforms.

There exist many classes of binary waveforms with good autocorrelation and cross-correlation properties (see for example, P. Fan and M. Darnell, *Sequence Design for Communications Applications*, Wiley, 1996; also, R. C. Dixon, *Spread Spectrum Systems with Commercial Applications*. Wiley, 1994), that can be employed as template binary waveforms for generating series of antithetic clicks. For example, as known to those skilled in the art, pseudorandom binary sequences and Gold sequences are particularly well suited to ranging applications.

In order to justify the method of constructing, in accordance with the invention, a series $c(t)$ of antithetic clicks for ranging purposes, it will be shown that such a constructed series does preserve, in a specific sense, the superior autocorrelation properties of the underlying template binary waveform $b(t)$.

For the purpose of the analysis to follow, it is helpful to view (see FIG. 7) a series $c(t)$ of antithetic clicks as a result of the three following operations performed on the underlying template binary waveform $b(t)$:

1. (pseudo)random uniform scaling of intervals between level transitions in the template binary waveform $b(t)$ to produce a binary waveform $z(t)$ with 'randomised' level transitions;
2. differentiation of the binary waveform $z(t)$ to produce a series $a(t)$ of alternating Dirac delta impulses $\delta(t)$ of opposite polarity, hence $a(t)=(d/dt)z(t)$;
3. convolution of the series $a(t)$ with suitable click signals representing the level transitions to produce the series $c(t)$ of antithetic clicks.

It is important to note that the order of performing the first two operations: time scaling and differentiation, may be changed. Accordingly, an equivalent method to obtain the same series $c(t)$ of antithetic clicks will include the steps of:

1. differentiation of the template binary waveform $b(t)$ to produce a series $p(t)$ of alternating Dirac delta impulses $\delta(t)$ of opposite polarity, hence $p(t)=(d/dt)b(t)$;
2. (pseudo)random uniform scaling of intervals between consecutive delta impulses occurring in the series $p(t)$ to produce another series $q(t)$ comprising delta impulses with randomised positions;
3. convolution of the series $q(t)$ with respective click signals to produce the series $c(t)$.

Figure 7:
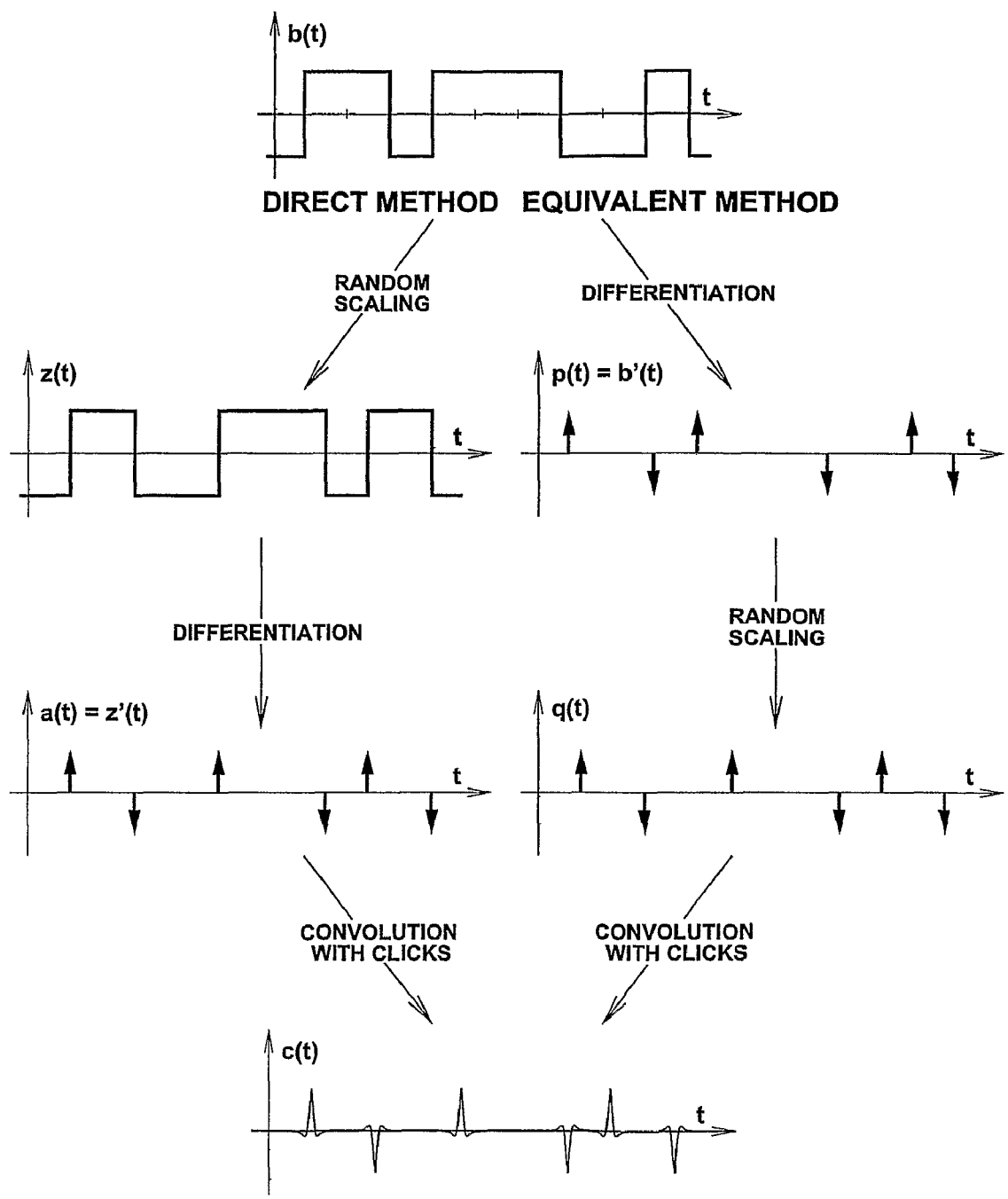
FIG. 7 illustrates symbolically two equivalent approaches to the generation of a series c(t) of antithetic clicks from a template binary waveform b(t).

FIG. 7 depicts symbolically the direct method and the equivalent method of the representation and construction of a series $c(t)$ of antithetic clicks obtained from an underlying template binary waveform $b(t)$.

The equivalent method will now be used to determine the autocorrelation function $R_{cc}(\tau)$ of a series of antithetic clicks $c(t)$.

Figure 8:
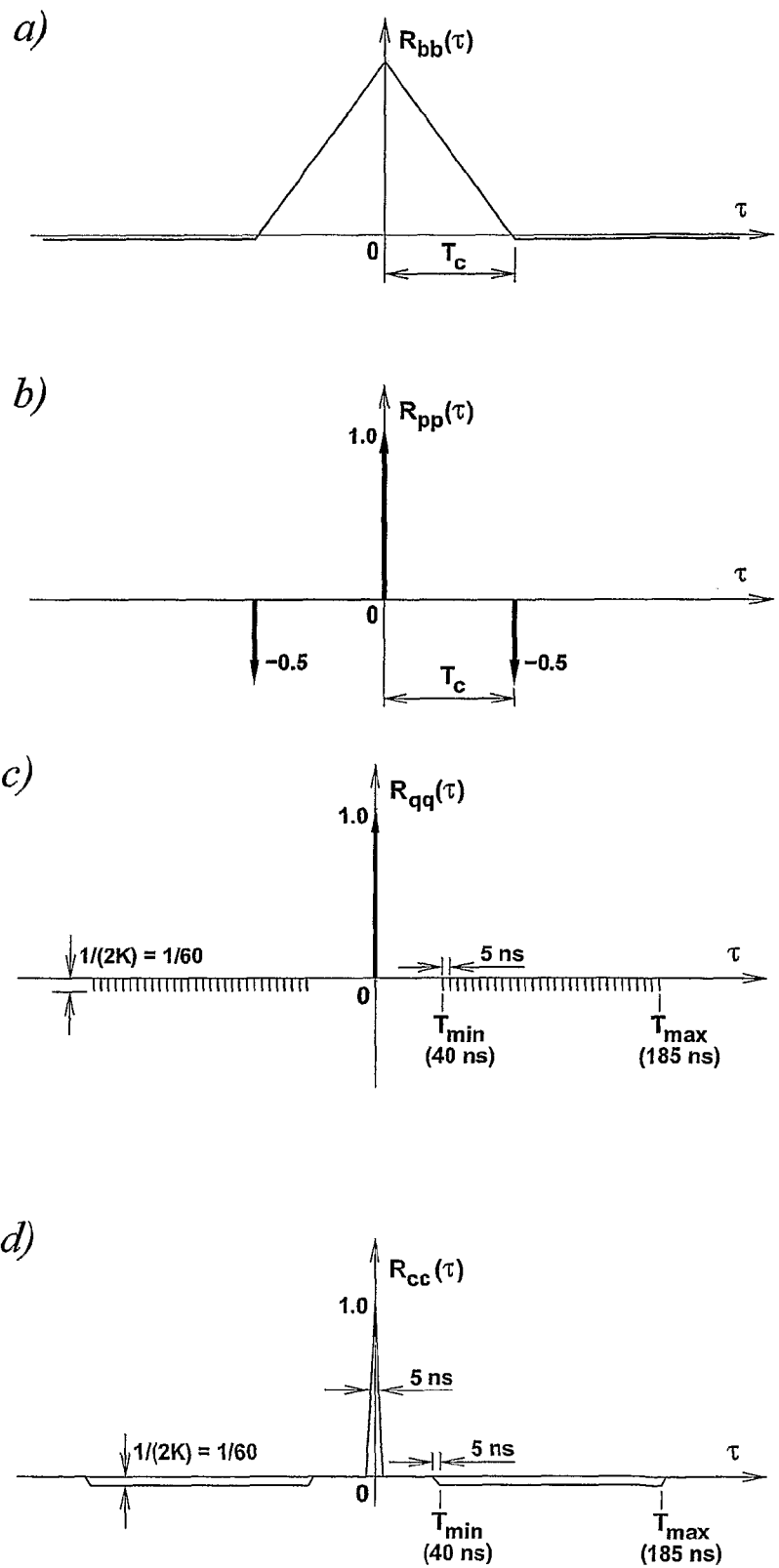

Assume that a template binary waveform $b(t)$ is a pseudorandom binary signal (prbs) with the autocorrelation function $R_{bb}(\tau)$ whose main part is depicted in FIG. 8a. Since the series $p(t)$ of delta impulses is the time derivative, $p(t) \equiv b'(t)=(d/dt)b(t)$, of the prbs $b(t)$, the autocorrelation function $R_{pp}(\tau)$ of the series $p(t)$ is the negated second derivative of the autocorrelation function $R_{bb}(\tau)$. Therefore $$R_{pp}(\tau) \equiv R_{b'b'}(\tau) = -\frac{d^2 R_{bb}(\tau)}{d\tau^2}$$

The shape of the normalised autocorrelation function $R_{pp}(\tau)$ of the series $p(t)$ is shown in FIG. 8b. As seen, in addition to a Dirac delta unit impulse at $\tau=0$, there are also two sidelobes, each assuming the form of a negative Dirac delta impulse with 'mass' equal to ½. The spacing between the main peak and either sidelobe equals the period of the clock pulses $T_c$.

A uniform spread of interpulse intervals of clock pulses will result in uniform spreading of the 'mass' of either negative impulse appearing in the autocorrelation function $R_{pp}(\tau)$. When a truly random mechanism is used for clock spreading, the uniform spread of the negative impulses can only be achieved in the statistical sense, i.e., over an indefinitely-long processing interval. Therefore, in accordance with the invention, in order to achieve a perfectly uniform spread of the sidelobes in a finite processing interval, a suitable pseudorandom signal is used for clock spreading.

FIG. 8c depicts the normalised autocorrelation function $R_{qq}(\tau)$ of a series $q(t)$ of impulses with positions 'randomised' according to the spread-period clock characteristics discussed in Example 1. As seen, the ½-'mass' of each negative sidelobe has been spread uniformly, in 30 discrete steps of 5 ns, between the minimum and maximum values of the interpulse interval (i.e., between $T_{min}=40$ ns and $T_{max}=185$ ns). The level of the sidelobes has been reduced to $1/(2K)=\frac{1}{60}$.

The autocorrelation function $R_{cc}(\tau)$ of a series $c(t)$ of antithetic clicks can be determined from $$R_{cc}(\tau)=R_{qq}(\tau)*g(\tau)*g(-\tau)$$

where * is the convolution operator, and $g(\tau)$ is the shape of clicks.

When $g(\tau)$ is a rectangular pulse, the autocorrelation function $R_{cc}(\tau)$ of a series of clicks can be expressed as $$R_{cc}(\tau)=R_{qq}(\tau)*\Lambda(\tau)$$

where $\Lambda(\tau)$ is a symmetric triangular function with the base equal to a doubled pulse duration.

FIG. 8d depicts the normalised autocorrelation function $R_{cc}(\tau)$ of a series $c(t)$ of antithetic clicks obtained from a prbs generator driven by clock pulses with characteristics discussed in Example 1; each click is a (positive or negative) rectangular pulse of 5 ns duration. As seen, each sidelobe is now a continuous function of delay $\tau$, and the level of the resulting negative plateau is equal to $1/(2K)=1/60$. It should be noted that the minimum value $T_{min}=40$ ns also determines the span of the so-called 'zero-correlation' zone.

In general, the resulting (reduced) level of negative sidelobes is inversely proportional to the extent $|T_{max}-T_{min}|$ of the uniform distribution of the clock interpulse interval. Therefore, it is possible to reduce the sidelobe level to an acceptable level by increasing the distribution extent.

From the above analysis, it follows that a series $c(t)$ of antithetic clicks does indeed preserve the superior autocorrelation properties of an underlying template pseudorandom binary waveform $b(t)$, especially when a suitable pseudorandom mechanism is utilized for clock spreading (i.e. time scaling of the template waveform). Therefore, a series of clicks, constructed in accordance with the invention, will exhibit correlation characteristics, well-suited to ranging purposes.

Figure 9:
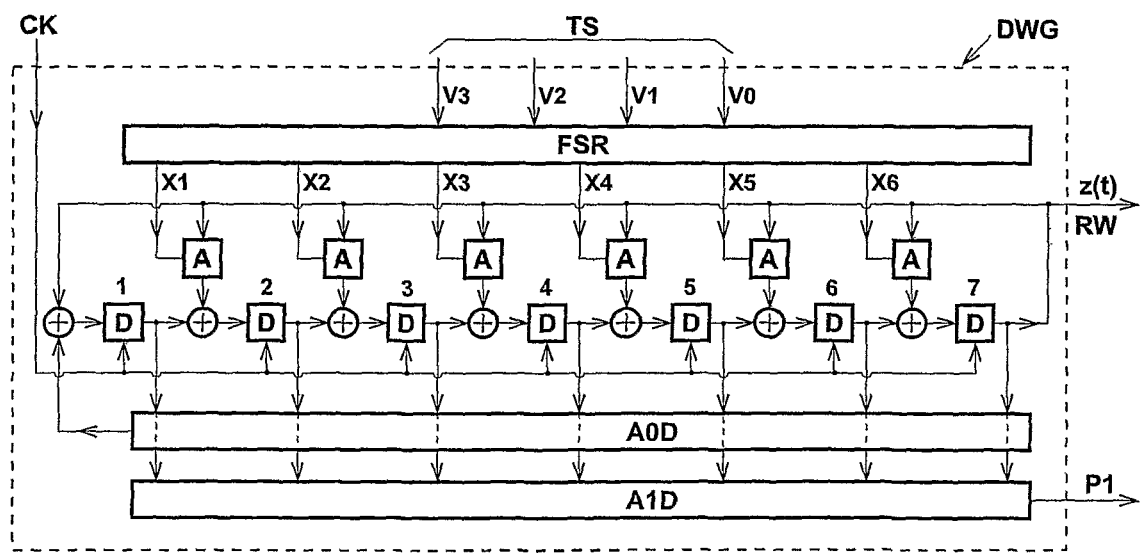
FIG. 9 is a block diagram of a practical implementation of a pseudorandom binary signal generator that may be incorporated in the programmable click generator of FIG. 3.

FIG. 9 is a detailed block diagram of a practical implementation of a pseudorandom binary signal (prbs) generator that may be used as the binary waveform generator DWG of FIG. 3. The generator comprises seven D-type flip-flops D forming a shift register, the flip-flops being labelled 1 to 7 in sequence, seven Exclusive-OR gates denoted by symbol ⊕, six AND gates A, and also the following auxiliary circuits:

1. An 'all-zero' detector A0D used to ensure self-start operation: when an 'all-zero' pattern has been detected in all seven flip-flops, the detector A0D produces a logic '1' that is fed, via an Exclusive-OR gate, to input of flip-flop 1.
2. An 'all-one' detector A1D that produces a logic '1' when an 'all-one' pattern has been detected in all seven flip-flops; such a pattern occurs once per one full period of the prbs. The output P1 of the detector A1D can be fed to a suitable counter to determine whether or not a prescribed number of prbs periods have been completed.
3. A 'feedback-select' decoder FSR that converts the 'template select' TS binary inputs (V3, V2, V1, V0) into binary patterns (X1, X2, X3, X4, X5, X6) that determine, via AND gates and Exclusive-OR gates, feedback logic variables driving the inputs of flip-flops 2 to 7. All 16 feedback functions, specified by four-variable input TS, are so selected as to make the generator produce 'maximal-length' sequences. As is well known to those skilled in the art, maximal-length sequences result in the maximum possible period, which for an r-stage shift register is $2^r-1$. For fixed values (V3, V2, V1), two 'mirror' (i.e., reversed in time) output sequences will be obtained by alternating the logic value at input V0. Each of the 16 available different signals produced by the prbs generator may be used as a template binary waveform $b(t)$.

A Table in FIG. 10 lists 16 four-variable logic functions that determine the form of linear-feedback provided by decoder FSR and used by the generator DWG to produce a particular template binary waveform $b(t)$.

Because the prbs generator employs seven flip-flops, and each feedback function ensures the generation of a 'maximal-length' signal, the duration of the period of each generated template binary waveform $b(t)$ is always equal to $2^7-1=127$ clock periods. While the duration of any particular realization of a binary waveform $z(t)$ with randomised level transitions is always equal to 127 clock interpulse intervals, its actual duration (expressed in time units) will be determined by a corresponding realization of the train of spread-period clock pulses.

In Example 2 that follows, a method is discussed for selecting an optimum (for signal processing) duration of a segment of a series $c(t)$ of clicks to be used for ranging.

Example 2

Assume that the template binary waveform $b(t)$ is a 'maximal-length' pseudorandom binary signal generated by a seven-stage shift register as shown in FIG. 9. Therefore, the duration of each prbs period will be equal to 127 clock interpulse intervals.

Assume also that the prbs generator is driven by a spread-period clock generator that operates cyclically, and its characteristics are the same as those discussed in Example 1, namely:
1. the number K of clock pulses occurring in a single cycle is equal to 30;
2. the minimum and maximum values of the interpulse interval are, respectively, $T_{min}=40$ ns and $T_{max}=185$ ns, with the average value of 112.5 ns,
3. the duration of the interpulse intervals always increases by a step of 5 ns.

When clock pulses with the above characteristics drive the prbs generator, the output compound binary waveform will repeat itself every $127 \times 30 = 3810$ clock interpulse intervals, or $3810 \times 112.5$ ns $\approx 429$ µs (this is because 127 and 30 are relative primes). Since during one prbs period there are, as is well known, $2^6 = 64$ antithetic clicks (i.e. transitions), the number of clicks observed during all 30 prbs periods will be equal to 1920.

Therefore, in order to achieve a perfectly uniform sidelobe spread (to the level of $-1/(2K)=-1/60$) in the normalised autocorrelation function $R_{cc}(\tau)$ of the click series $c(t)$, the optimum processing interval can be determined either by counting the number (30) of complete prbs periods, or counting the number (1920) of consecutive clicks being generated (of course, integer multiples of those numbers are also acceptable).

Figure 11:
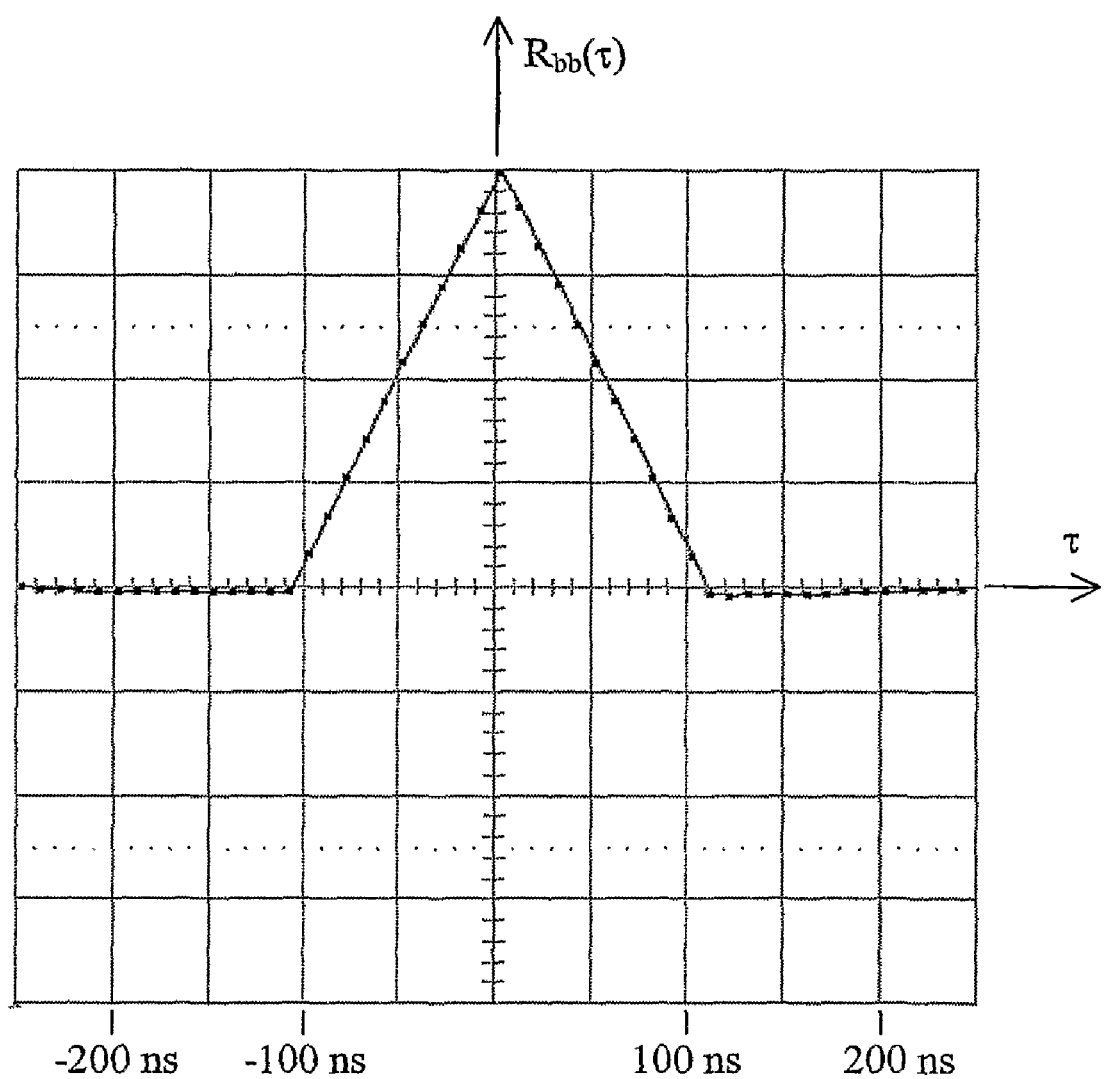
FIG. 11 depicts the main triangular part of an empirical autocorrelation function $R_{bb}(\tau)$ of a pseudorandom binary signal (prbs).
Figure 12:
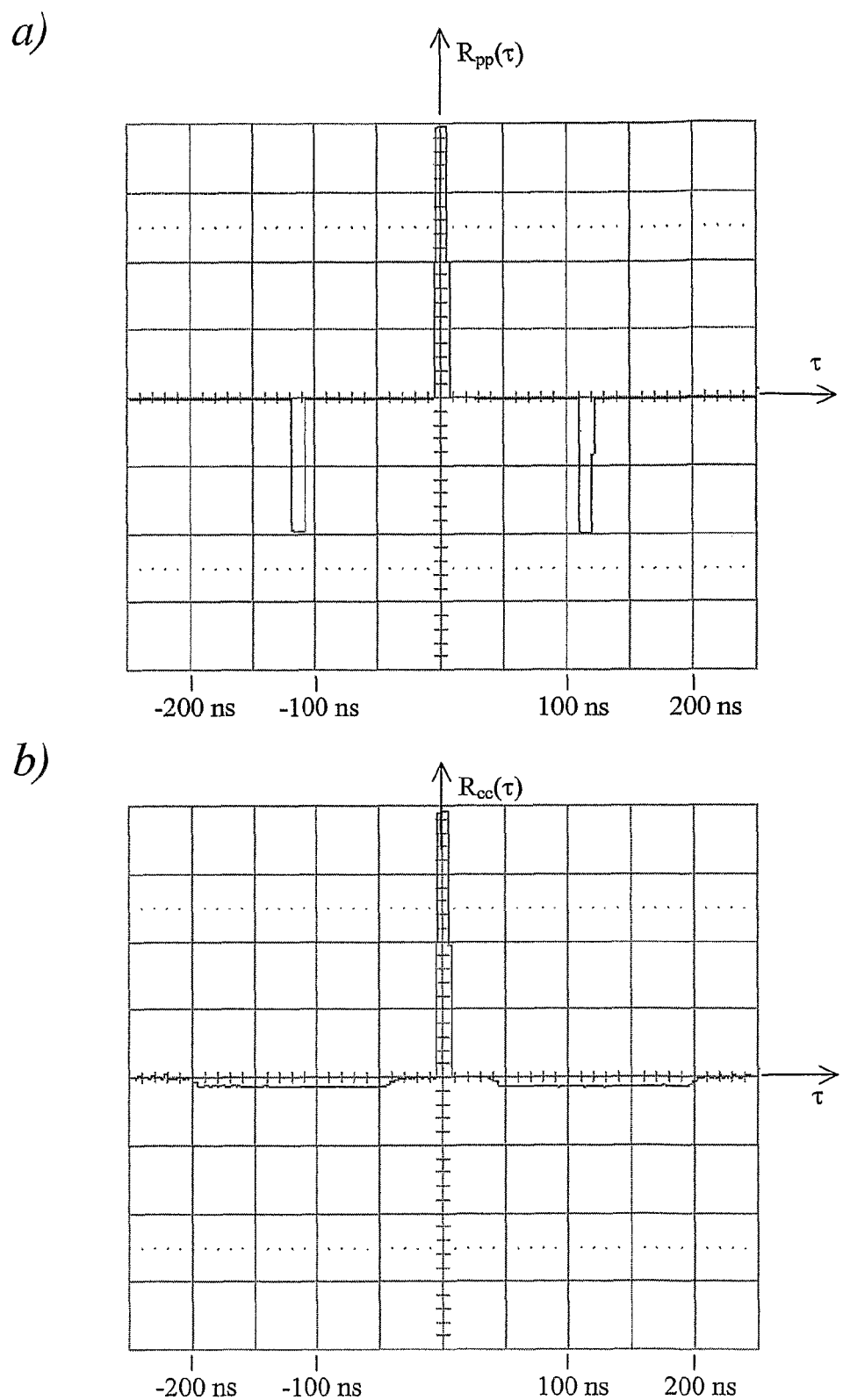
FIG. 12a depicts an empirical normalised autocorrelation function $R_{pp}(\tau)$ of a series $p_o(t)$ of short bipolar pulses generated at the level transitions of a pseudorandom binary signal (prbs) with the autocorrelation function $R_{bb}(\tau)$ shown in FIG. 11.
FIG. 12b depicts an empirical normalised autocorrelation function $R_{cc}(\tau)$ of a series c(t) of clicks obtained by 'randomising' the positions of clicks in the series $p_o(t)$ with the use of a spread-period clock.

FIG. 11 depicts the main triangular part of an empirical autocorrelation function $R_{bb}(\tau)$ obtained experimentally from a pseudorandom binary signal (prbs) produced by the prbs generator of FIG. 9; the clock period $T_c$ is equal to 110 ns. FIG. 12a depicts an empirical normalised autocorrelation function $R_{pp}(\tau)$ of the series $p_o(t)$ of short pulses, or clicks (instead of Dirac delta impulses). Each click is a (positive or negative) rectangular pulse of duration 5 ns. The series $p_0(t)$ has been derived from a pseudorandom binary signal (prbs) with the autocorrelation function $R_{bb}(\tau)$ shown in FIG. 11. As seen, in addition to the main unit peak at $\tau=0$, there are also two negative peaks (sidelobes), each with a level equal to $-\frac{1}{2}$. The spacing between the main peak and either negative peak equals the period of the clock pulses $T_c=110$ ns.

FIG. 12b depicts an empirical normalised autocorrelation function $R_{cc}(\tau)$ of a series $c(t)$ of clicks derived from an underlying pseudorandom binary signal orbs) with the autocorrelation function $R_{bb}(\tau)$ shown in FIG. 11. Again, each click is a (positive or negative) rectangular pulse of duration 5 ns, but in this case each click has its position 'randomised' according to the spread-period clock characteristics discussed in Example 1. As predicted by the theoretical analysis, the level of each negative sidelobe plateau is equal to $-1/60$ between the minimum and maximum values of the interpulse interval (i.e., between $T_{min}=40$ ns and $T_{max}=185$ ns).

The experimental results presented above confirm the main conclusion of the theoretical analysis that a series $c(t)$ of antithetic clicks preserve the superior autocorrelation properties of an underlying template pseudorandom binary waveform b(t). Some differences between the predicted results (FIG. 8b and FIG. 8d) and those obtained experimentally (FIG. 12a and FIG. 12b) are the consequence of using discrete delays in a pulse coincidence correlator and employing a digital-to-analogue converter with a coarse resolution.

In accordance with a further independent aspect of the invention, as described below, the disclosed above programmable click generator is utilized to implement a method for intermittent sensing of the surrounding dense-signal electromagnetic environment to select such a form of an interrogating series of antithetic clicks that will ensure an improved detection of obstacles in the presence of other active sensors operating in the region.

Figure 13:
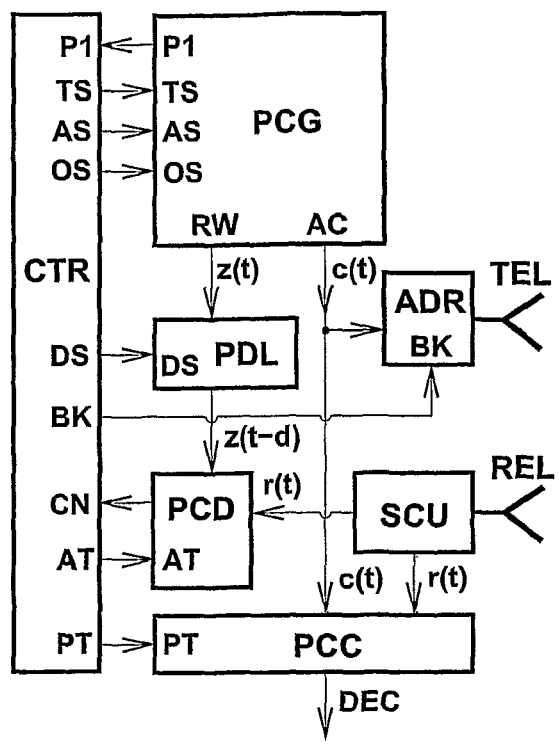
FIG. 13 is a block diagram of an adaptive multi-user obstacle-detection system configured to operate in accordance with the invention.

FIG. 13 is a block diagram of another adaptive multi-user obstacle-detection system configured to operate in accordance with the invention. The system comprises a programmable click generator PCG (such as the one shown in FIG. 3), an antenna driver ADR connected to a transmit antenna TEL, a receive antenna REL connected to a signal conditioning unit SCU, a programmable delay circuit PDL, a pulse collision detector/counter PCD, a pulse-coincidence correlator PCC, and a control unit CTR.

The system has two alternating modes of operation:
1. a sense/intercept (SI) mode (passive);
2. a standard transmit/detect (TD) mode (active).

The control unit CTR receives the signals:
P1, from the binary waveform generator DWG (see FIG. 9) of the programmable click generator PCG, when each prbs period has been completed;
CN, from the pulse collision detector/counter PCD, where CN is the number of registered pulse collisions.
and the control unit CTR supplies the signals:
TS, AS and OS to the programmable click generator PCG, respectively to select a template waveform and an average value of interpulse interval, and to perform permutation of interpulse intervals;
DS, to the programmable delay circuit PDL, to select a delay that corresponds to a range gate of interest;
BK, to the antenna driver ADR, to blank the transmitter while operating in sense/intercept SI passive mode;
AT, to the pulse collision detector/counter PCD, to determine the observation interval needed to analyse potential pulse collisions;
PT, to the pulse-coincidence correlator PCC, to determine the optimum interval for processing received signals while operating in transmit/detect TD mode.

While in SI mode, the operations performed by the adaptive obstacle-detection system can be summarised as follows:
1. First, the control unit CTR blanks, via input BK, the antenna driver ADR so that the system is silent and does not transmit its own interrogating clicks. The CTR unit also selects a respective delay d, via input DS, of the programmable delay circuit PDL to determine a range cell of interest. Also, signal AT is supplied by the CTR to the pulse collision detector/counter PCD to determine a required observation interval.
2. The pulse collision detector/counter PCD processes jointly, within a predetermined interval AT, two types of signals: a binary waveform z(t−d) delayed in the PDL and an interfering signal r(t) intercepted by the antenna RA and preprocessed by the signal conditioning unit SCU, to determine the number of potential pulse collisions CN, if the interrogating clicks were actually sent (there is no own transmission in SI mode). An excessive number of such collisions would impair the detection performance of the system.
3. If the number CN of potential collisions has not exceeded a predetermined decision threshold, the binary waveform z(t) under examination is regarded as being suitable for producing clicks to be transmitted. Consequently, the system may proceed to transmit/detect TD mode and perform its standard functions and operations.
4. However, if the number CN of potential collisions has exceeded a predetermined decision threshold, the binary waveform z(t) is regarded as being unsuitable for producing interrogating clicks. In this case, depending on the adopted strategy, the control unit CTR may alter any one or more of a variety of parameters to:
A. select another template binary waveform, via input TS of the PCG;
B. select another permutation of clock interpulse intervals, via input OS of the PCG;
C. reduce the average clock interpulse interval, via input AS of the PCG, thereby increasing the average transmitted power;
D. increase the processing time PT utilized by the pulse-coincidence correlator PCC, thereby increasing the cumulative energy of a signal transmitted during that time;
E. use a suitable random number generator to change continually template binary waveforms and/or permutations of clock interpulse intervals; in such a case, a transmitted series of clicks will resemble a random pulse process with intensity determined by the average clock interpulse interval;
and thereafter the system checks again to determine whether the number CN of potential collisions has exceeded the predetermined decision threshold.

The steps 1 to 4 of the above procedure may be carried out for selected range cells (e.g., closest to the system), or they may be repeated for every range cell of interest.

When many systems of the disclosed type are operating in the same region, it is reasonable to assume that each system will eventually attempt to select step 4E (random selection of template binary waveforms and random permutation of clock interpulse intervals), as a "minimax" strategy, known from game theory. Then, each system may adjust the click intensity (by modifying the average clock interpulse interval, as in step 4C) according to the level of interference sensed in the surrounding electromagnetic environment.

While the adaptive obstacle-detection system operates in transmit/detect TD mode, the pulse-coincidence correlator PCC processes jointly, during a predetermined time PT, a reference click series c(t), obtained from the generator PCG and received clicks r(t) supplied by the signal conditioning unit SCU. As a result, a decision DEC is made regarding the presence or absence of an obstacle at a predetermined range.

It will be obvious to those skilled in the art that some, or even all, operations performed by the programmable delay circuit PDL and the pulse collision detector/counter PCD can be carried out by a suitably modified pulse-coincidence correlator PCC.

Figure 14:
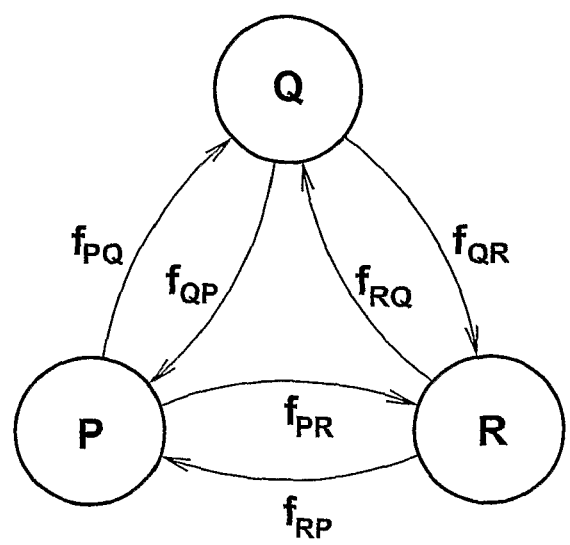
FIG. 14 depicts schematically a method that utilizes pulses with six different carrier frequencies to encode the transitions between three distinct states of a ternary waveform.

Although the present invention uses binary pseudorandom sequences to construct series of clicks with good correlation properties, the disclosed technique is not limited to such use, being also applicable to m-level pseudorandom sequences, known to those skilled in the art. For example, when a ternary sequence is utilized as a template ternary waveform, transitions between the three distinct states, say P, Q and R, may be encoded by six different clicks, such as pulses with six different carrier frequencies: $f_{PQ}$, $f_{QP}$, $f_{QR}$, $f_{RQ}$, $f_{RP}$, $f_{PR}$ as depicted schematically in FIG. 14.

In general, when an m-level pseudorandom sequence is utilized, the number of different clicks required for encoding the transitions between the m levels will be equal to m(m−1). However, in some applications, many more clicks than m(m−1) may be employed, and the clicks to be actually transmitted may be allocated and swapped dynamically in time to provide a more robust system.

Furthermore, clicks of short duration can be replaced by suitable waveforms (such as pulses with linear frequency modulation) that are transmitted, and then after being received can be compressed in matched filters to produce required short responses.

The foregoing description of preferred embodiments of the invention has been presented for the purpose of illustration and description. It is not intended to be exhaustive or to limit the invention to the precise form disclosed. In light of the foregoing description, it is evident that many alterations, modifications, and variations will enable those skilled in the art to utilize the invention in various embodiments suited to the particular use contemplated.

The invention claimed is:

1. A method for detecting an object, the method comprising the steps of:
   (a) generating a first signal which has plural discrete states which occur in an irregular sequence and in which transitions between states occur at varying time offsets with respect to notional regular clock pulses;
   (b) transmitting, in response to each state transition in the first signal, a pulse which is encoded according to the type of state transition;
   (c) obtaining a received signal comprising reflections of the transmitted pulses;
   (d) deriving a reference signal from the first signal;
   (e) introducing a delay between the received signal and the reference signal;
   (f) deriving an output value dependent on the extent to which pulses in the received signal coincide with transitions in the reference signal; and
   (g) determining, in dependence on said output value, whether an object is located at a range corresponding to said delay.

2. A method as claimed in claim 1, wherein the time offsets are distributed between predetermined minimum and maximum values.

3. A method as claimed in claim 1, wherein the time offsets are distributed substantially uniformly between the predetermined minimum and maximum values.

4. A method as claimed in any preceding claim, wherein the time offsets vary in a pseudo-random manner.

5. A method as claimed in claim 1, including the steps of:
   (h) additionally deriving said output value while inhibiting the transmission of pulses; and
   (i) dependent on the output value, changing at least one parameter used to generate the first signal, in order to alter a characteristic of the first signal.

6. A method as claimed in claim 5, wherein the varying time offsets have a sequence which is altered in dependence on the output value.

7. A method as claimed in claim 6, the method comprising generating a variable period clock signal for controlling the timing of the state transitions of said first signal, wherein the intervals between clock pulses of the variable period clock signal are each determined by generating a random number and counting regular clock pulses until a count value bears a predetermined relationship with the random number.

8. A method as claimed in claim 7, including the step of altering said predetermined relationship in order to alter the sequence of varying time offsets.

9. A method for detecting an object, the method comprising the steps of:
   (a) using at least one parameter to generate a first signal which has plural discrete states which occur in an irregular sequence;
   (b) transmitting, in response to each state transition in the first signal, a pulse which is encoded according to the type of state transition;
   (c) obtaining a received signal comprising reflections of the transmitted pulses;
   (d) deriving a reference signal from the first signal;
   (e) introducing a delay between the received signal and the reference signal;
   (f) deriving an output value dependent on the extent to which pulses in the received signal coincide with transitions in the reference signal; and
   (g) determining, in dependence on said output value, whether an object is located at a range corresponding to said delay;
   the method being characterised by the steps of
   (h) additionally deriving said output value while inhibiting the transmission of pulses; and
   (i) dependent on the output value, changing said at least one parameter to alter a characteristic of the first signal.

10. A method as claimed in claims 5 or 9, wherein the irregular sequence of states is varied in dependence on the output value.

11. A method as claimed in claim 5 or 9, further comprising:
   repeating steps (e) and (f) for different values of said delay and thereby obtaining a plurality of output values each associated with a respective delay.

12. A method as claimed in claim 5 or 9, wherein the irregular sequence is determined in a pseudo-random manner.

13. A method as claimed in claim 5 or 9, wherein the irregular sequence is a binary sequence.

14. A method as claimed in claim 5 or 9, wherein the irregular sequence has m states, where m>2, and wherein there are m(m−1) types of transitions.

15. A method as claimed in claim 5 or 9, wherein the pulses are transmitted using a carrier-less ultrawideband technique.

16. An apparatus comprising:
   means for generating a first signal which has plural discrete states which occur in an irregular sequence and in which transitions between states occur at varying time offsets with respect to notional regular clock pulses;
   means for transmitting, in response to each state transition in the first signal, a pulse which is encoded according to the type of state transition;
   means for obtaining a received signal comprising reflections of the transmitted pulses;
   means for deriving a reference signal from the first signal;
   means for introducing a delay between the received signal and the reference signal;
   means for deriving an output value dependent on the extent to which pulses in the received signal coincide with transitions in the reference signal; and
   means for determining, in dependence on said output value, whether an object is located at a range corresponding to said delay.

17. An apparatus for detecting an object, comprising:
   means for using at least one parameter to generate a first signal which has plural discrete states which occur in an irregular sequence;

means for transmitting, in response to each state transition in the first signal, a pulse which is encoded according to the type of state transition;

means for obtaining a received signal comprising reflections of the transmitted pulses;

means for deriving a reference signal from the first signal;

means for introducing a delay between the received signal and the reference signal;

means for deriving an output value dependent on the extent to which pulses in the received signal coincide with transitions in the reference signal, while inhibiting the transmission of pulses by said transmitting means; and means for determining, in dependence on said output value, whether an object is located at a range corresponding to said delay; and means for changing said at least one parameter to alter a characteristic of the first signal, dependent on the output value.

* * * * *